United States Patent [19]

Dunmire

[11] 3,914,833
[45] Oct. 28, 1975

[54] PIPE CLAMP ASSEMBLY AND METHOD
[75] Inventor: Paul George Dunmire, Sonoma, Calif.
[73] Assignee: Johns-Manville Corporation, Denver, Colo.
[22] Filed: May 28, 1974
[21] Appl. No.: 473,986

[52] U.S. Cl. .................................. 24/279; 138/99
[51] Int. Cl.² .................. F16L 55/16; B65D 63/06
[58] Field of Search ........ 138/99; 24/282, 284, 285, 24/286, 280, 281, 279

[56] References Cited
UNITED STATES PATENTS

| | | | |
|---|---|---|---|
| 2,601,420 | 6/1952 | Stackhouse | 24/279 |
| 2,826,799 | 3/1958 | Schustack | 24/279 |
| 3,151,632 | 10/1964 | Risley et al. | 138/99 |
| 3,204,665 | 9/1965 | Faint | 138/99 |
| 3,267,547 | 8/1966 | Morriss | 24/279 |
| 3,848,638 | 11/1974 | Huslander et al. | 138/99 |

Primary Examiner—Donald A. Griffin
Attorney, Agent, or Firm—Robert M. Krone; Stephen C. Shear

[57] ABSTRACT

A pipe clamp assembly and method of tightening a band with sealing gasket around a pipe for repairing leaking or broken sections are disclosed herein. The assembly includes a discontinuous malleable band which is positionable around a pipe such that, at least initially, opposite end portions of the band are adjacent to but spaced from one another leaving a gap under which an armoring strip is located to bridge the gap. The assembly also includes a lug arrangement comprising a pair of cooperating lugs respectively connected to the band end portions and means for drawing the lugs and end portions closer together to tighten the band around the pipe. One of the lugs includes at least one but preferably a plurality of projecting fingers which extend over the gap between the end portions of the band. The other lug, which preferably lies substantially in its entirety directly under the projecting fingers of the first lug, includes a lug portion positioned directly over the gap and under the projecting fingers.

13 Claims, 3 Drawing Figures

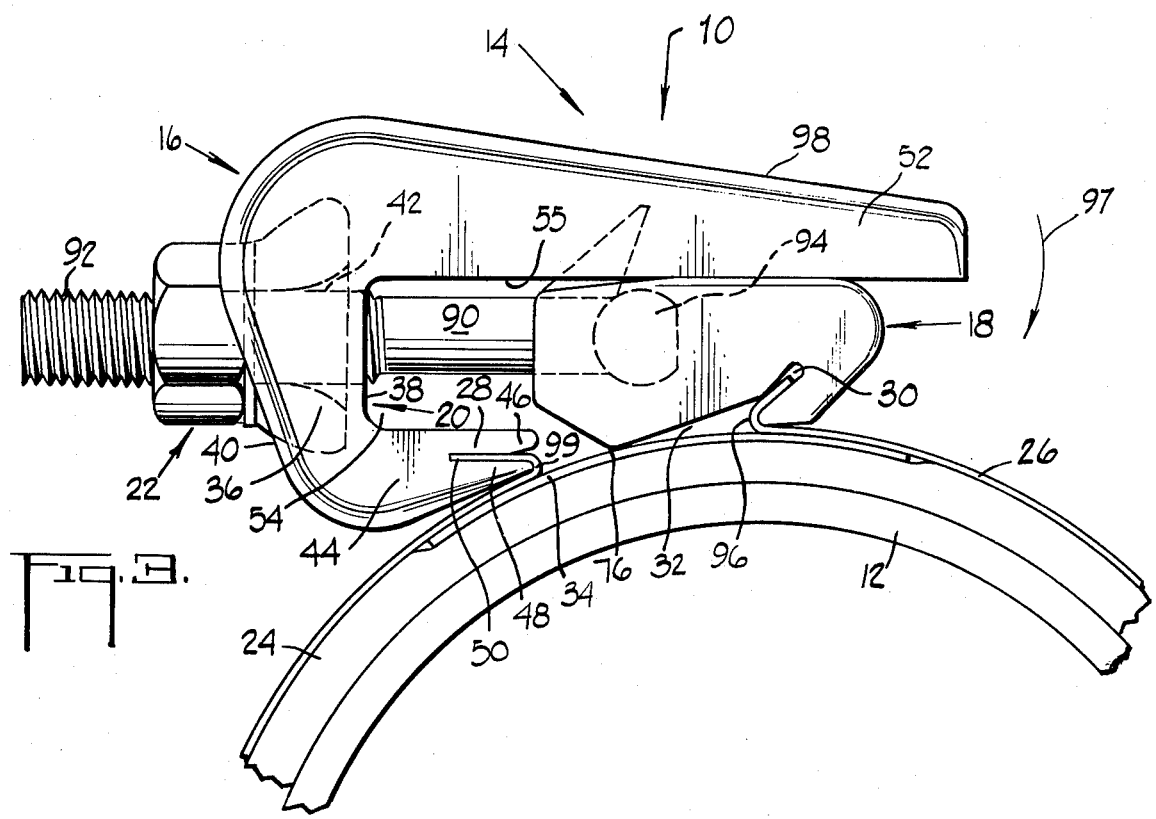

PIPE CLAMP ASSEMBLY AND METHOD

BACKGROUND OF THE INVENTION

The present invention relates generally to a clamp assembly and more particularly to a pipe clamp assembly utilizing a particular lug arrangement and method.

The utilization of a pipe clamp to repair a break or leak in a pipe is well established in the pipe industry. A typical clamp will include a gasket which is positioned at least partially around the pipe and particularly over the defective area and one or more discontinuous malleable bands which are positioned together partially around the gasket leaving one or more gaps between adjacent ends of the band or bands to allow for tightening bands and for variations in pipe outer diameters (O.D.'s). To seal between the gaps, an armoring strip is often positioned directly over the gasket and extends from directly under one band end portion to the adjacent spaced band portion. The band or bands are tightened around the gasket by means of cooperating lugs which are connected to adjacent ends of the bands and drawn toward one another, thereby reducing the gaps and squeezing the bands tightly against the gasket which, in turn, is held tightly against the pipe.

There are any number of clamps which, generally speaking, are of the type described. For example, pipe clamps of this type are disclosed in the following U.S. Pat. Nos.: 3,254,387; 3,267,547; 3,209,427; 3,204,665; 3,189,970; 3,183,938; 3,175,267; 3,173,450; 3,151,632; 3,089,212.

The above-recited patents comprises only a small group of what is probably a much larger group of patents related to pipe clamps generally and pipe leak-repair clamps in particular. The various clamp assemblies disclosed in these patents and those disclosed in the prior art generally have both advantages and disadvantages. However, there is a continuing effort being made by those in the industry to improve upon prior art pipe clamp assemblies. This, of course, includes striving to provide a more economical clamp assembly, one which can be more readily assembled, one which is more reliable, and one which provides for a large variation in types of pipes it can accommodate, i.e., range of pipe O.D.'s. As will be seen hereinafter, the present invention addresses itself not only to these general objectives but also to more specific objectives such as, for example, to improve upon the sealing capability of the clamp around the gap or gaps defined by adjacent ends of the discontinuous band or bands, to provide a more versatile assembly, and, as just stated, to accommodate a wide range of pipe outside diameters.

BRIEF SUMMARY OF THE INVENTION

One object of the present invention is to provide a versatile clamp assembly which utilizes a particular lug arrangement and which is economical, reliable and can be readily assembled.

Another object of the present invention is to provide a clamp assembly which accommodates a wide range of pipe outside diameters.

Still another object of the present invention is to provide a lug arrangement which provides improved sealing capabilities at the gaps between adjacent ends of the bands comprising part of the clamp assembly.

Yet another object of the present invention is to provide a lug arrangement which preferably includes one or more bolts but which utilizes bolts substantially shorter in length than heretofore required.

The present invention achieves the above-stated objects, as well as other objects to become apparent hereinafter, by providing at least one pair of cooperating lugs which are respectively connectable to adjacent but spaced-apart ends of a malleable band. The band is positioned around an object such as pipe and the band ends are drawn closer together for closing the gap therebetween and tightening the band around the object. To accomplish this, one of the lugs includes one or more projecting fingers which are spaced outwardly of and extend over the gap, preferably entirely across it. The other lug, which is preferably located substantially in its entirety directly under the projecting fingers of the first-mentioned lug, includes a lug portion also located under the projecting fingers and directly over the gap between the adjacent band ends. The two lugs are moved together to bring the adjacent band ends closer to one another by suitable means, preferably one or more bolts interlocked directly to the first-mentioned lug and directly to the lug portion of the second-mentioned lug located directly over the gap. These bolts or other such means preferably cooperate with the second-mentioned lug such that, during tightening of the band, the lug portion at least initially tends to pivot inwardly towards that portion of the object located across the gap, bearing down on an armoring strip located between the band ends and pipe. This effectively reduces the unsupported distance of the armoring strip across the gap by as much as, for example, one half, thereby minimizing weakness at one of the otherwise weakest points of the overall arrangement, i.e., point around the gap.

BRIEF DESCRIPTION OF THE DRAWINGS

FIG. 3 is a side elevatioinal view of the assembly of FIG. 1.

DETAILED DESCRIPTION AND PREFERRED EMBODIMENTS

Figure 1:
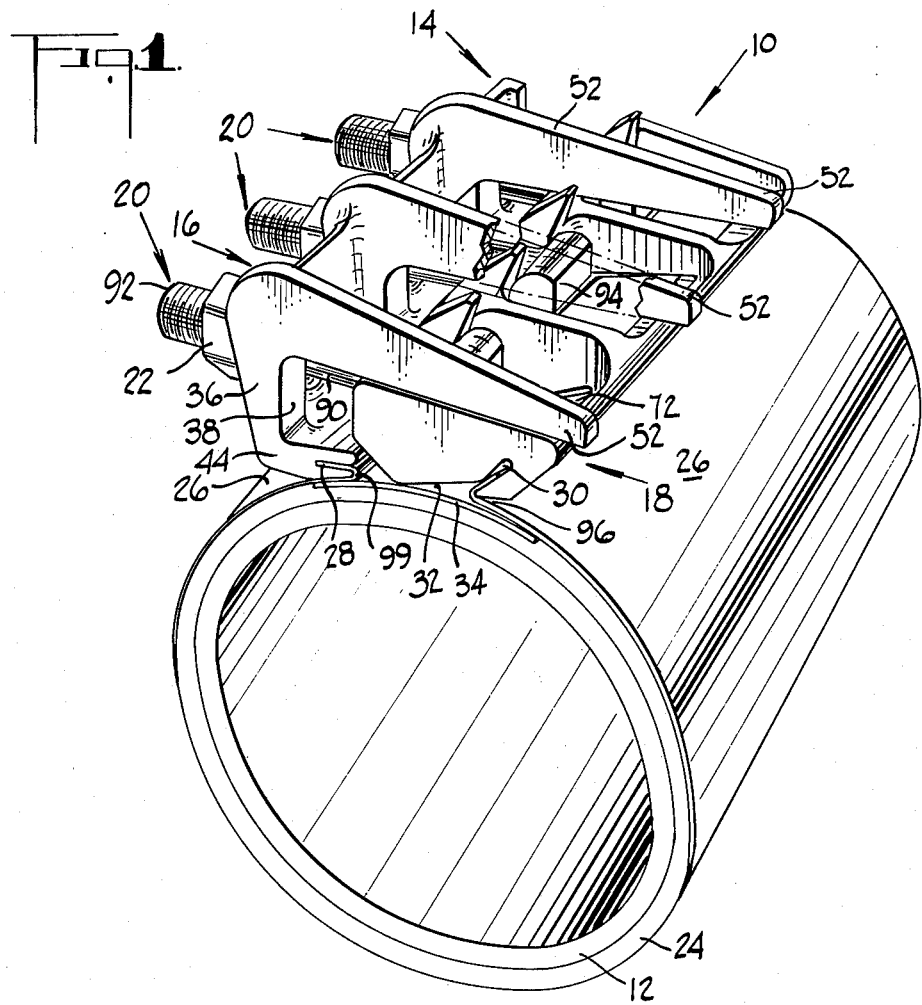
FIG. 1 is a perspective view, partially broken away, of a pipe clamp assembly, particularly one which is adapted to repair a pipe leak or break, constructed in accordance with the present invention.

Turning now to the drawings, wherein like components are designated by like reference numerals throughout the various figures, a clamp assembly 10, constructed in accordance with the present invention, is shown in FIGS. 1 and 3 assembled to a pipe 12. Assembly 10 includes at least one lug arrangement 14 comprising a pair of particularly designed cooperating lugs 16 and 18, a plurality of particularly designed bolts 20 and a equal plurality of nuts 22 thread mounted around common ends of the bolts. The assembly also includes a discontinuous but preferably somewhat annular sealing gasket of known kind 24 which is positioned around the outer surface of pipe 12 and one or more metal or other such malleable bands 26. If one band is used, which is the case in the preferred embodiment of the present invention, it is positioned around gasket 24 such that its opposite end portions 28 and 30 are located adjacent to but spaced apart from one another leaving a gap 32 therebetween. If more than one band is provided, they are positioned in end-to-end relationship around the gasket leaving more than one gap between adjacent ends and, of course, requiring more than one lug arrangement.

Assembly 10 preferably further includes one or more armoring strips 34, equal in number to the number of gaps 32, the armoring strips being provided for covering those exposed outer surface portions of gasket 24 located in the gaps 32, i.e., to bridge the gaps. As stated above, in the preferred embodiment of the present invention only one band 26 is provided leaving only one gap 32 and therefore requiring only one armoring strip 34. As illustrated best in FIG. 3, this armoring strip is positioned directly against the outer surface of gasket 24 and extends across gap 32 directly under adjacent band end portions 28 and 30.

As will be seen hereinafter, a portion of lug 18 of lug arrangement 14 at least initially tends to pivot inwardly and bear against armoring strip 34 as band 26 is initially tightened around gasket 24 and pipe 12. This, in turn, results in greater support of the armoring strip and greater sealing capabilities around gap 32 than would otherwise be possible if the armoring strip buckled outwardly or, in any event, if the armoring strip were not held tightly between gasket 24 and band end portions 28 and 30. In addition, by holding the armoring strip tightly in place to assure that it does not buckle or otherwise tend to be loose during and after tightening of the band, the length of the band provided and the distance across gap 32 is not as critical as would be the case if the armoring strip were unsupported across its length. In other words, so long as armoring strip 34 is sufficiently long to bridge gap 32, a band 26 of given length to be used with a pipe of given outer diameter could also be utilized around pipes of greater outer diameters. This, of course, generally improves the versatility of the overall clamp assembly and specifically allows the assembly to accommodate a wider range of pipe O.D.'s than might otherwise be possible.

Before discussing the operation of clamp assembly 10, attention is directed to the individual components making up lug arrangement 14 and, in this regard, attention is firstly directed to lug 16 which is shown in FIGS. 1 and 3. As illustrated, lug 16 includes a somewhat vertically extending main body portion 36 (FIG. 3) having what will be referred to as a frontside 38 and a backside 40. As best seen in FIG. 3, main body portion 36 includes a plurality of spaced-apart bolt-receiving openings 42 extending from frontside 38 to backside 40. Actually, only one bolt, to be described hereinafter, and therefore only one bolt-receiving opening would be required by lug arrangement 14 if the width of band 26 were sufficiently small. However, in most cases, more than one bolt is utilized in lug arrangement 14 and therefore, main body portion 36 of lug 16 includes more than one opening 42. Actually, there are the same number of openings as there are bolts. These openings, while not specifically shown, are laterally aligned with one another and are preferably centrally located across main body portion 36.

Lug 16 also includes a band connecting portion 44 which is preferably integrally formed with main body portion 36 and which extends forwardly of frontside 38 at the lower end of the main body portion. Portion 44 includes suitable means for securely holding one end portion of band 26, for example, end portion 28, to lug 16. In an actual working embodiment, the band holding means is comprised of a pair of spaced-apart jaws 46 and 48 (see FIG. 3) defining a slot 50 therebetween. The band holding portion and particularly jaws 46 and 48 are preferably constructed of a malleable metal material. Actually, the entire lug and, in fact, both lugs are preferably made of this material. Hence, the jaws can be bent open for easy insertion of band end portion 28 into slot 50 and thereafter bent closed for holding the band end portion within the slot, as illustrated in FIG. 3. While this along may not be sufficient for holding the band end portion in place, suitable means, well known in the art, could be readily provided for achieving this.

In addition to main body portion 36 and band holding portion 44, lug 16 includes a plurality of fingered portions or guide fingers 52 (see FIG. 1) as they are commonly called. These guide fingers are also preferably integrally formed with main body portion 36 and project in a forward direction, preferably parallel with band holding portion 44, from the top of main body portion 36, thereby defining a space 54 (see FIG. 3) between portion 44 and the bottom surfaces 55 of the guide fingers. These guide fingers are spaced apart from one another and actually lie to one side of and above bolt-receiving openings 42. In addition, as best illustrated in FIG. 3, the guide fingers are preferably of sufficient length to extend entirely across (and of course above) gap 32 when assembly 10 is in its initially assembled position.

Figure 2:
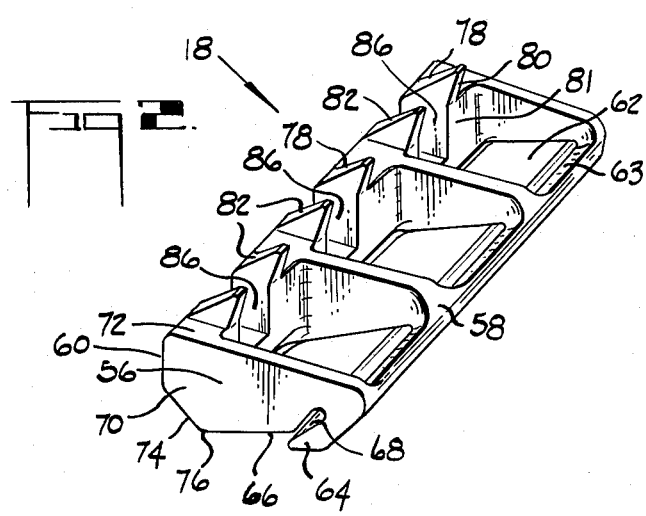
FIG. 2 is a perspective view of one lug comprising part of the assembly of FIG. 1.

Having described lug 16, attention is now directed to lug 18 which is best shown in FIG. 2. This lug includes a main body portion 56 having what will be referred to as a backside 58 and a frontside 60 and a preferably flat, tapering top surface 62. Main body portion 56 also includes suitable means for securely holding one end portion of band 26, for example end portion 30, to lug 18. Any suitable means known in the art will suffice. For example, as illustrated, the holding means provided by portion 56 is preferably similar to the holding means provided by portion 44 of lug 16. More specifically, main body portion 56 of lug 18 is shown including a jaw 64 spaced from a bottom surface 66 of the main body portion such that a slot 68 is defined therebetween. Main body portion 56 and particularly jaw 64 are preferably constructed of a malleable metal material so that the jaw can be initially bent open for easy insertion of band end portion 30 into slot 68 and thereafter closed to hold the band end portion within the slot. This is illustrated in FIG. 1. In the event that this is not sufficient to hold the band end portion in place, suitable means well known in the art can be readily provided to achieve this.

Body portion 56 of lug 18 includes a frontal portion 70 which projects in a forward direction from the tapering surface 62 of the main body portion. In this regard, frontal portion 70 includes a top surface 72 joining the front side 60 which, in turn, joins with a bottom surface 74. Surface 74 joins the lower end of tapering bottom surface 66 at point 76.

Frontal portion 70 includes a plurality of bolt-interlocking flanges 78 which project up from surface 72. These bolt-interlocking flanges include a backside 80, a frontside 82, and a plurality of bolt-receiving openings 86. Each of these openings extends from backside 80 to frontside 82 and open upwardly for easy access therein. In addition, the openings, which are equal in number to the number of bolts 20 provided by lug arrangement are laterally spaced apart from one another. In fact, with lug arrangement 14 in an assembled position as shown in FIGS. 1 and 3, the openings 86 are correspondingly aligned with openings 42 of lug 16 for cooperatively receiving corresponding bolts 20. Certainly, if lug arrangements 14 only includes one bolt and lug 16 only includes one opening 42, lug 18 will only include one opening 86.

As stated above, lug arrangement 14 includes at least one and preferably a plurality of bolts 20, preferably Tee bolts, and a corresponding number of cooperating nuts 22. Each of the bolts includes a longitudinal shaft 90 having at least one end portion 92 which is threaded to receive a cooperating nut. A cross-bar 94, which is preferably cylindrical or partially cylindrical in shape, is provided at the other end of each shaft 90 and extends perpendicular thereto. Cross-bars 94 may be integrally formed with or otherwise suitably connected to the shafts, thus defining Tee bolts. For reasons to be apparent hereinafter, bolts 20 are substantially shorter in length than the typically used bolts in most pipe clamp assemblies of the prior art. This, of course, results in a cost savings in the manufacture of assembly 10 and particularly lug arrangement 14.

Having described clamp assembly 10, attention is now directed to the manner in which it is assembled around a pipe 12, for example, to repair a leak in the pipe. In this regard, gasket 24 may first be wrapped around a portion of the pipe and particularly over the defective area. Thereafter, band 26 may be positioned around the pipe and over the gasket so as to leave a gap 32 between band end portions 28 and 30. In an acutal working embodiment, the gasket is prebonded to the internal surface of the band by means of suitable adhesive. Either before or after the gasket and band are positioned, armoring strip 34 may be positioned under the band end portions, against gasket 24 and across gap 32 as illustrated in FIG. 3. In this regard, the armoring strip may be prebonded to the gasket across the gap position. Band end portion 28 may thereafter be suitably connected with portion 44 of lug 16 and band end portion 30 in a similar manner may be suitably connected with portion 56 of lug 18 in the manner discussed above. The band end portions can be secured to the lugs after band 26 has been positioned around pipe 12 but are preferably preassembled therewith. Note that when the gasket 24, band 26, and armoring strip 34 are prebonded together and the ends of band 26 are preassembled to lugs 16 and 18, one complete unit may be provided with no loose parts. In this regard, the bolts 20 and nuts 22 would be provided in place as shown in FIGS. 1 and 3.

Band end portions 28 and 30 are respectively secured to lugs 16 and 18 and band 26 is positioned around pipe 12 and particularly gasket 24 such that guide fingers 52 of lug 16 are located above and at least partially across gap 32. The guide fingers are preferably of sufficient length to extend entirely across the gap. Lug 18 is located under guide fingers 52, preferably in its entirety. In any event, frontal portion 70 including bolt-interlocking flanges 78 and openings 86 is located under guide fingers 52 and directly over gap 32, as best illustrated in FIG. 3.

Prior to positioning lugs 16 and 18 in the manner just discussed, shafts 90 of bolts 20 are positioned through bolt holes 42 of lug 16, if not already in position, such that threaded portions 92 lie rearward of main body portion 36. The other ends of shafts 90 are swung into openings 86 between bolt-interlocking flanges 78 such that cross-bars 94 are located in the space between flanges 78 and tapering surface 62 and such that these cross-bars bear against the backside 81 directly below backsides 80 of flanges 78. Thereafter, with the lugs and bolts positioned in the manner shown in FIGS. 1 and 3, nuts 22 are thread mounted, if not already in place, over threaded end portions 92 of the bolts to bear against backside 40 of lug 16.

To tighten band 26 around pipe 12 and particularly around gasket 24, nuts 22, by rotation, are moved to the right, as viewed in FIG. 1. This causes lug 16 to move to the right or in the direction of lug 18 and it simultaneously causes lug 18 to move to the left or towards lug 16. This is, of course, assuming that the two band end portions 28 and 30 apply approximately equal resistance to movement of the lugs toward one another, which is generally the case if the band is initially positioned firmly around the pipe.

It should be noted that the center lines of shafts 90, if extended, would be located above point 96, the point at which band end portion 30 applies resistance to movement of lug 18 in the direction of lug 16. Hence, as the two lugs are initially moved toward one another, frontal portion 70 of lug 18 tends to pivot inwardly about point 96 and into gap 32, thereby bearing against armoring strip 34 at point 76 and pressing gasket 24 against the pipe at the opening of the gap. Obviously, if point 76 is initially located against the armoring strip and the latter is initially firmly against the gasket, actual pivoting movement may not take place. But, in any event, frontal portion 70 will tend or want to pivot as the bolts are initially tightened. As the lugs are moved closer together, that is, as the bolts are tightened, the pressure against the armoring strip and gasket increases. This provides for an improved seal at gap 32 during assembly operation and also allows for better versatility of the overall clamp.

In addition to the initial pivoting of frontal portion 70 of lug 18, as the lugs move toward one another, the guide fingers 52 of lug 16 tend to pivot downwardly in the direction of arrow 98. These guide fingers tend to pivot about a point 99, the point at which band end portion 28 applies resistance to the movement of lug 16 in the direction of lug 18. As the lugs are moved closer toward one another for decreasing gap 32 and tightening band 26, guide fingers 52 bear against a top surface 63 of lug 18 (see FIG. 2), thereby keeping the lug from rotating and pressing both band attached points 96 and 99 against the pipe. This, of course, reduces and more than likely eliminates the previously discussed pivoting action of lug 18 which, in turn, reduces and more than likely eliminates the force applied to armoring strip 34 at point 76 of lug 18. However, band end portions 28 and 30 are, at this time, so close together and gap 32 is sufficiently small that pressure on the armoring strip is no longer necessary. In addition, lug 18, at point 96, does exert some pressure against the armoring strip as a result of the tendency of guide fingers 52 to pivot in the direction of arrow 98 and bear against surface 63.

In addition to the previously discussed advantages of clamp assembly 10 and particularly lug arrangement 14, various other advantages should be specifically pointed out. For example, with lug arrangement 14 constructed in the aforedescribed manner, there is substantially no eccentric loading on bolts 20 during tightening of band 26. There are two primary reasons for this. Firstly, while guide fingers 52 and actually the entire lug 16 want to pivot or rotate about point 99, the guide fingers, bearing against lug 18, prevents actual pivoting of lug 16. Hence, there are substantially no eccentric forces applied to the bolts by lug 16. Secondly, even though frontal portion 70 of lug 18 does tend to pivot toward and against armoring strip 34 about point 96, the cross-bars 94 of bolts 20 and actually the overall shafts of these bolts are not interlocked to frontal portion 70 with respect to this pivoting movement. Hence, as the frontal portion does pivot inwardly, it does not apply similarly directed forces to the bolts.

In its preferred embodiment, as illustrated in FIGS. 1–3, the clamp assembly of the present invention has been described as including a single band 26 and a lug arrangement including a plurality of bolts. As stated previously, more than one band could be provided, in which case more than one lug arrangement would also be required. Further, the lug arrangement could include a single bolt if the width of the band 26 were sufficiently small. In addition, it is to be understood that clamp assembly 10 is not necessarily limited in use to that described, i.e., as a pipe leak repair clamp, but can be used to clamp a malleable band around objects other than a cylindrical pipe.

What I claim is:

1. A lug arrangement for supporting discontinuous malleable band means around an object such as a pipe and for decreasing the gap between adjacent but spaced-apart ends of said band means, said arrangement comprising:
   a. a first lug having first means for holding one of said ends of said band means to said lug and finger means extending at least partially across and spaced above said gap;
   b. a second lug having second means for holding the other of said ends of said band means and a lug portion located under said finger means of said first lug and over said gap between said ends of said band means; and
   c. means for moving said lugs toward each other whereby to tighten said band means around said object, said moving means cooperating with and positioned relative to said second lug such that, during tightening of said band means, said lug portion at least initially tends to pivot inwardly towards a portion of said object located across said gap so as to bear at least indirectly against said object portion.

2. A lug arrangement according to claim 1 wherein said moving means includes
   a. at least one bolt, one end portion of which is interlocked with said lug portion of said second lug so as to move said second lug towards said first lug and the other end portion of which passes through an opening in said first lug and beyond a surface of said first lug, and
   b. a nut mounted around said other end portion of said bolt and adapted to engage against said surface of said first lug.

3. A lug arrangement according to claim 2 wherein the centerline of said bolt, if extended, would be located outwardly of the point about which said lug portion tends to pivot.

4. A lug arrangement according to claim 2 wherein
   a. said lug portion includes a segment projecting outwardly of said object, said segment having a slot extending its length and opening outwardly, and
   b. said bolt includes a cross-bar connected with and normal to said one end portion, said one end portion being adapted to lie within said slot and said cross-bar being adapted to lie to one side of said segment away from said first lug.

5. A lug arrangement according to claim 1 wherein said second lug is located in substantially its entirety within the space between said finger means and said object after tightening of said band means.

6. An arrangement according to claim 1 including an elongated strip sufficiently long to bridge said gap, said strip extending across said gap between said object and the ends of said band means, said lug portion, during said tightning of said band means, bearing against said strip, thereby indirectly bearing against said object portion.

7. A lug arrangement, comprising:
   a. a first lug including
      i. a main body portion having a frontside, a backside and a plurality of spaced openings extending through said body portion from said frontside to said backside,
      ii. a band-holding portion integrally formed with the lower end of said main body portion and extending forwardly therefrom below said openings, said band-holding portion having means for holding an end segment of a malleable band below said openings, and
      iii. a plurality of spaced fingered portions integrally formed with the upper end of said main body portion and extending forwardly therefrom and forwardly of said band-holding means above said openings;
   b. a second lug including
      i. a rearward band-holding portion having means for holding an end segment of a malleable band, and
      ii. a bolt-coupling portion integrally formed with and extending forwardly of said rearward band-holding portion and last-mentioned holding means, said bolt-coupling portion having a frontside, a backside and a plurality of spaced slots equal in number to said plurality of openings, said slots extending from said backside to said frontside and opening upwardly;
   c. lug coupling means including
      i. a plurality of bolts equal in number to said openings, each of said bolts having a longitudinal cylindrical shaft at least one end portion of which is threaded and a cross-bar connected with and normal to the other end of said shaft, and
      ii. an equal plurality of nuts adapted for thread mounting around the threaded end portions of said shafts; and
   d. said second lug being positionable in substantially its entirety directly below and adjacent the fingered portions of said first lug such that
      i. the frontside of the main body portion of said first lug and the frontside of the bolt coupling portion of said second lug face one another,
      ii. the openings in said main body portion are longitudinally aligned with respective slots in said coupling portion, and
      iii. the threaded end portion of each of said bolt shafts is adapted to extend through one of said openings from the frontside to the backside of said main body portion while the other end of the shaft lies within an aligned slot with its associated cross-bar bearing against the backside of said coupling portion.

8. A lug arrangement according to claim 7 wherein
   a. the holding means of said second lug includes a slot in said band-holding portion, said slot extending in a direction rearwardly and upwardly relative to said bolt coupling portion, and
   b. the lowermost and forwardmost point of said slot is spaced below the centerlines of said bolt shafts when said bolts are positioned to couple said lugs together.

9. A pipe clamp arrangement comprising
   a. discontinuous malleable band means including two end portions, said band means being positionable around a pipe such that at least initially said end portions are adjacent but spaced from one another leaving a gap therebetween;
   b. a first lug connected with one of said end portions and including finger means extending at least partially across and above said gap;
   c. a second lug positioned in substantially its entirety between said finger means and said pipe, said second lug being connected with the other one of said end portions of said band means and including a lug portion located over said gap and under the finger means of said first lug; and
   d. means interlocked with said first lug and said second lug for moving said lugs toward one another so as to decrease the distance between said end portions, said moving means including a bolt, one end of which is interlocked with said first lug and the other end of which is directly interlocked with said lug portion of said second lug directly below said finger means and above said gap.

10. An arrangement according to claim 9 wherein said moving means is interlocked with said lugs such that, upon initially moving said lugs together, said lug portion at least initially tends to pivot inwardly into said gap.

11. A method of reducing the gap between two adjacent but spaced-apart ends of malleable band means positioned around an object such as a pipe, comprising
    a. connecting a first lug with one of said ends such that a portion of said lug extends over and above said gap;
    b. connecting a second lug to the other of said ends such that a portion of said second lug is located under said portion of said first lug and over said gap; and
    c. moving said lugs towards one another so as to cause said portion of said second lug to have a tendency to pivot inwardly into said gap so as to at least indirectly bear against a portion of said object located across said gap.

12. A method according to claim 11 wherein an elongated strip sufficiently long to bridge said gap is located across said gap between said object and the ends of said band means and wherein said lug portion at least initially during the movement of said lugs toward one another, bears against said strip, thereby indirectly bearing against said object portion.

13. A pipe clamp arrangement comprising:
    a. discontinuous malleable band means including two end portions, said band means being positioned around a pipe such that at least initially said end portions are adjacent but spaced from one another leaving a gap therebetween:
    b. a first lug connected with one of said end portions and including finger means extending at least partially across and above said gap;
    c. a second lug connected with the other one of said end portions and including a lug portion located over said gap and under the finger means of said first lug;
    d. an elongated strip sufficiently long to bridge said gap, said strip extending across said gap between said pipe and said end portions of said band means and inwardly of said lug portion; and
    e. means for moving said lugs toward each other whereby to tighten said band means around said pipe, said moving means cooperating with and positioned relative to said second lug such that, during tightening of said band means, said lug portion at least initially tends to pivot inwardly so as to bear against that portion of said elongated strip located across said gap.

* * * * *